W. S. FOUTS.
AUTOMATIC PUMP.
APPLICATION FILED JAN. 21, 1919.

1,321,022.

Patented Nov. 4, 1919.

Witnesses

Inventor
William S. Fouts,
By
Attorneys

UNITED STATES PATENT OFFICE.

WILLIAM S. FOUTS, OF ALTAMONT, KANSAS.

AUTOMATIC PUMP.

1,321,022.  Specification of Letters Patent.  Patented Nov. 4, 1919.

Application filed January 21, 1919. Serial No. 272,247.

*To all whom it may concern:*

Be it known that I, WILLIAM S. FOUTS, a citizen of the United States, residing at Altamont, in the county of Labette and State of Kansas, have invented certain new and useful Improvements in Automatic Pumps; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in automatic pumps for automobiles, and consists in the provision of a simple and efficient pumping apparatus of this nature adapted to be attached to an automobile, from the motor of which the pump receives power to inflate the tires.

My invention is a simple and efficient device of this character, having various details of construction, combination and arrangement of parts which will be hereinafter fully described, shown in the accompanying drawings and then specifically defined in the appended claim.

I illustrate my invention in the accompanying drawings which, with the letters of reference marked thereon, form a part of this application and in which.

Figure 1:
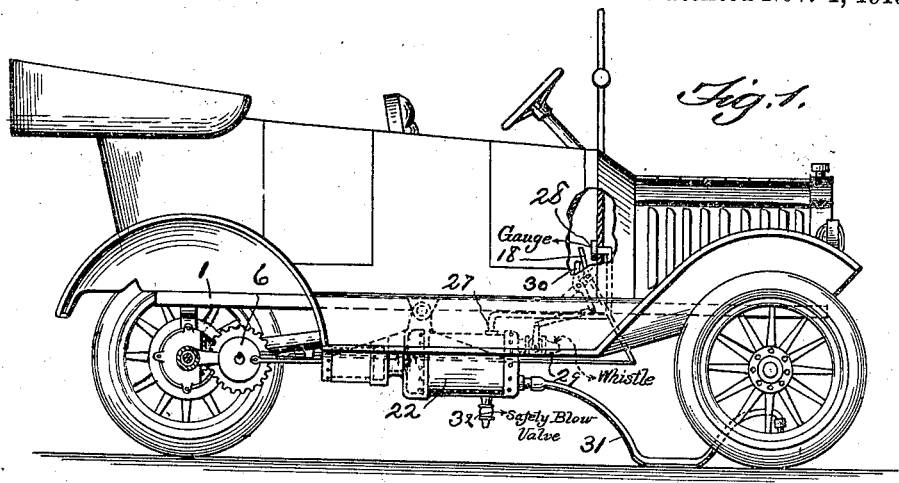
Figure 1 is a side elevation of an automobile, showing my improved pumping apparatus applied thereto.
Figure 2:
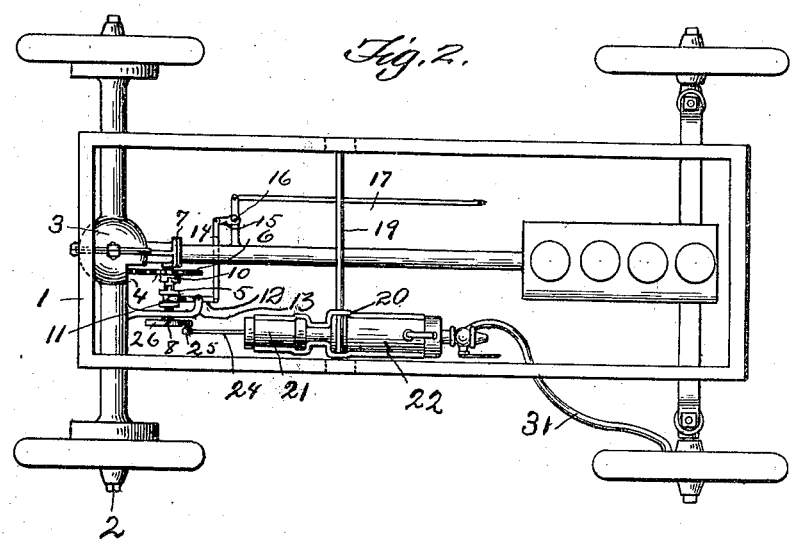
Fig. 2 is a plan view with the body removed.
Figure 3:
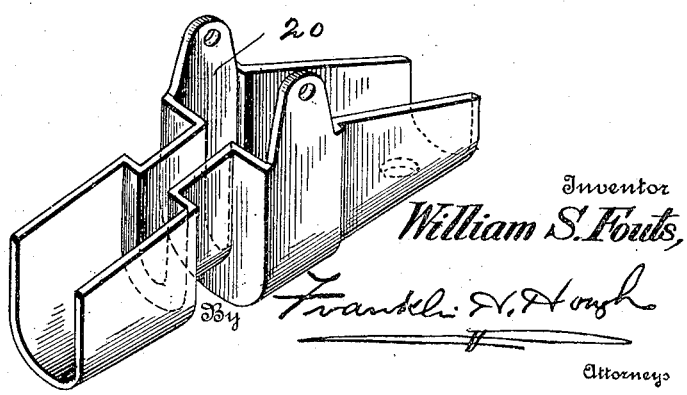
Fig. 3 is an enlarged detail perspective of a cradle, in which the pump and air supply cylinder are mounted.

Reference now being had to the details of the drawings by numerals:

1 designates the chassis of an automobile having a driving axle 2 with the intermeshing gear mounted within the casing 3 which is cut away at 4 to permit power to be transmitted therefrom. Mounted upon the chassis 1 of the automobile is a shaft 19, and 20 designates a cradle, a large detail view of which is shown in Fig. 3 of the drawings, said cradle being adapted to support a combination pump 21 and air compression chamber 22 formed *en bloc*, said air chamber being adapted to be connected through a suitable valve regulated means to the pipe 31 for inflating the tires of the automobile.

The pump is provided with a stem 24 which is pivotally connected through the medium of a pin 25 with a disk 26, rotating with the shaft 8 which is journaled in suitable bearings in the bracket arm 13 and the casing 7. A clutch 5 is splined to the shaft 8 and has a laterally projecting lug designed for engagement with a notch in the clutch collar 10 rotating with the gear wheel 6 which is in mesh with a gear 4 rotating with the axle 2. A forked member 12, pivoted to the bracket arm 13, is pivotally connected through the medium of a link 14 with an angled lever 15 pivotally mounted at 16 upon an arm of the casing, and 17 is a rod pivoted to the end of the lever, and which in turn is pivotally connected to a tread lever 18 within convenient reach of the operator near the steering wheel.

The storage tank 22 has a pipe 27 leading therefrom, extending to a gage 28 upon the dash board. Said tank 22 is also provided with a whistle 29, air being admitted thereto through the medium of a valve actuated by a tread lever 30. A safety blow-off valve 32 is provided on the lower portion of the supply tank 22.

In operation, when it is desired to actuate the pump, the operator by depressing the foot lever 18 may throw the pump into gear with the driving axle of the automobile, causing the piston within the pump to compress air and force the same into the tank 22, where air may be stored. When the pressure upon the tank 22 is at any desired degree, the pump may be thrown out of gear. With the supply of air in the reservoir the whistle may be sounded as a signal and a supply of air always at hand for inflating tires when desired.

What I claim to be new is:

A cradle for attachment to automobiles, designed to support a combination tank and pump for inflating tires, said cradle made to conform to the shape of the tank and pump, and made of a single piece of metal with opposite walls apertured, a rod adapted to be supported by the frame of an automobile and upon which said cradle is mounted.

In testimony whereof I hereunto affix my signature in presence of two witnesses.

WILLIAM S. FOUTS.

Witnesses:
J. WESLEY HUDGEN,
BEULAH M. KINGSBURY.

Copies of this patent may be obtained for five cents each, by addressing the "Commissioner of Patents, Washington, D. C."